L. HEISER.
STEAM COOKER.
APPLICATION FILED MAY 21, 1915.
1,192,306.
Patented July 25, 1916.
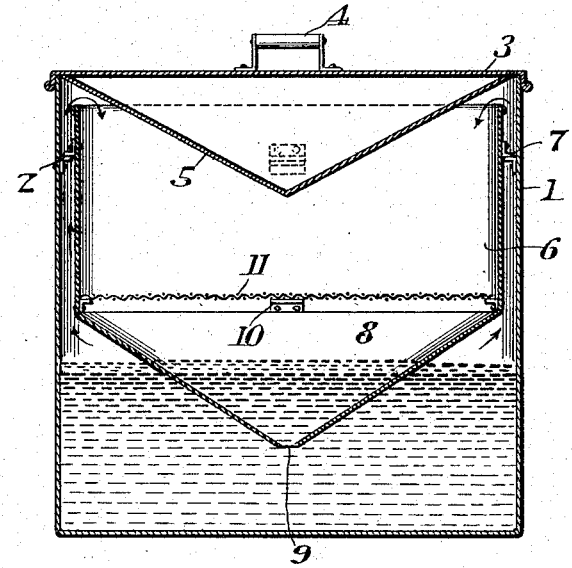
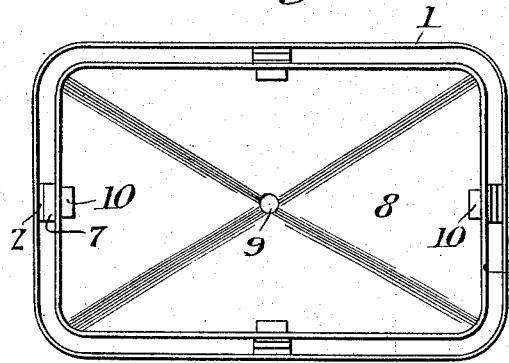
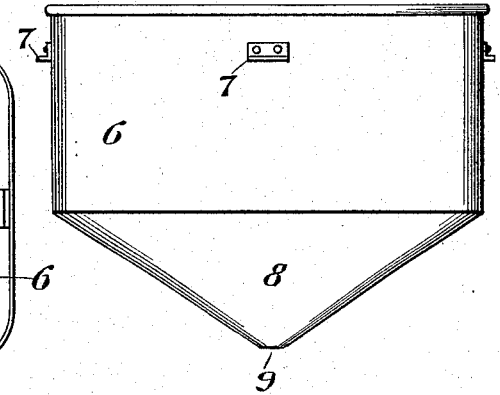
Witnesses
M. E. Loughlin
Inventor
L. Heiser,
By Victor J. Evans
Attorney

UNITED STATES PATENT OFFICE.

LUCIEN HEISER, OF NEW YORK, N. Y.

STEAM-COOKER.

1,192,306. Specification of Letters Patent. Patented July 25, 1916.

Application filed May 21, 1915. Serial No. 29,615.

*To all whom it may concern:*

Be it known that I, LUCIEN HEISER, a subject of the Emperor of Germany, residing at New York, in the county of New York and State of New York, have invented new and useful Improvements in Steam-Cookers, of which the following is a specification.

This invention relates to steam cookers and it consists in the novel features hereinafter described and claimed.

An object of the invention is to provide a cooker of the character indicated which is of simple and durable structure, having its parts so arranged that when a food article is being cooked therein it may not be permitted to cook in its own grease. That is to say, as soon as the fat of the food article is melted by the action of the steam, it is permitted to precipitate into a receptacle provided within the cooker where it is retained until the cooking operation is completed in such a position that the greater quantity of steam which passes to the food article does not penetrate the grease or melted fat. By this arrangement, the article while it is being cooked is continuously subjected to the steam from the water and is not subjected to steam which is contaminated or rendered undesirable by reason of the fact that it is first passed through grease or fat before arriving at the article.

With the above object in view the cooker comprises an outer boiler with a receptacle located therein, there being space provided between the outer surface of the receptacle and the inner surface of the boiler. The receptacle is provided with a cone-shaped depending bottom having an opening at its lowest point. A screen or grating is disposed transversely across the receptacle above the bottom thereof and a detachable cover is mounted upon the boiler, the said cover being provided at its under side with a cone-shaped depending section which enters the upper portion of the receptacle when the cover is in position upon the boiler.

In the accompanying drawing:—Figure 1 is a vertical sectional view of the boiler. Fig. 2 is a top plan view of the same with the cover removed. Fig. 3 is a side elevation of the receptacle.

The cooker includes a boiler 1 which may be of any usual design or pattern and which is provided at its inner side and in the vicinity of its upper edge with inwardly disposed brackets 2. The boiler 1 and the brackets thereof are preferably made from sheet metal. A cover 3 is adapted to close the upper end of the boiler 1 and the said cover is provided upon its upper side with a handle 4. The cover 3 is provided at its under side with a depending conical section 5. The cover and the section 5 thereof are preferably made from sheet metal. A receptacle 6 also of sheet metal is detachably mounted in the boiler 1 and is provided at the outer surfaces of its sides with lugs 7 adapted to rest upon the brackets 2 whereby the said receptacle is supported in the boiler 1 with its sides spaced from the side of the boiler and its bottom spaced from the bottom of the boiler. The receptacle 6 is provided with a depending cone-shaped bottom 8 which is provided at its lowest point with an opening 9. Brackets 10 are mounted at the inner surfaces of the sides of the receptacle 6 at points just above the edges of the bottom 8 and a screen 11 is removably supported upon the brackets 10.

When the parts of the cooker are assembled they assume the relative positions shown in Fig. 1 of the drawing wherein it will be seen that the lower portion of the section 5 of the cover projects into the upper part of the receptacle 6 but the said section 5 is spaced from the upper edge of the said receptacle. A quantity of water is placed in the lower portion of the boiler 1 and the surface of the water is at a level above the opening 9 in the bottom 8 of the receptacle 6. The article of food to be cooked is placed upon the screen 11 and then the lower portion of the boiler is subjected to heat. During the cooking operation the water in the boiler 1 is brought to the boiling point whereby steam is generated at the surface of the water beyond the outer sides of the bottom 8 of the receptacle 6. This steam passes up through the space between the sides of the receptacle 6 and the boiler 1 and strikes the cone-shaped section 5 of the cover 3 and is deflected in a downward direction upon the article of food which is supported upon the screen 11. As the article of food is heated by the application of the steam thereto, the fat in the article is melted and this runs down through the screen 11 and precipitates upon the water which is located within the bottom 8 of the receptacle 6. As the passage of the steam to the food article is continuous during the time that it is being cooked, and inasmuch as the steam rises from the surface of the water beyond the outer sides of the bottom 8, the food article is continuously subjected to steam generated from water and the drippings from the food article are accumulated within the conical portion of the bottom 8 and upon the surface of the water therein. Therefore, the article is not subjected to steam which passes through the fat or grease from the article and for this reason the objection incident to cooking an article in its own fat or grease is avoided.

After the article is cooked, the cover 3 is removed from the boiler 1 and the article may be removed from the receptacle 6 and prepared for serving.

From the above description taken in conjunction with the accompanying drawing, it will be seen that a steam cooker of simple and durable structure is provided and that the cooker involves a novel and advantageous cooking operation which avoids the objectionable features hereinbefore pointed out.

Having described the invention what is claimed is:—

1. A cooker comprising a boiler, a cover for the boiler, said cover having a depending conical section, a receptacle adapted to be supported in the boiler with its sides spaced from the sides of the boiler and its bottom spaced from the bottom thereof, the bottom of the receptacle being provided with an opening and a screen supported in the receptacle above the bottom thereof.

2. A cooker comprising a boiler, brackets mounted at the inner surfaces of the sides of the boiler, a cover for the boiler having a depending conical section, a receptacle having lugs adapted to engage the brackets whereby the receptacle is supported in the boiler with its sides spaced from the sides thereof and its bottom spaced from the bottom thereof, the bottom of the said receptacle being cone-shaped and provided at its lowest point with an opening, brackets located within the receptacle above the bottom thereof and a screen resting upon the brackets.

In testimony whereof I affix my signature in presence of two witnesses.

LUCIEN HEISER.

Witnesses:
JOHN A. DONEGAN,
GEORGE HUTZLER.

Copies of this patent may be obtained for five cents each, by addressing the "Commissioner of Patents, Washington, D. C."